(12) United States Patent
Polyakov

(10) Patent No.: US 11,795,833 B1
(45) Date of Patent: Oct. 24, 2023

(54) NOZZLE SET

(71) Applicant: PIPL LIMITED, Nicosia (CY)

(72) Inventor: Maxym Polyakov, Edinburgh (GB)

(73) Assignee: PIPL LIMITED, Nicosia (CY)

( * ) Notice: Subject to any disclaimer, the term of this patent is extended or adjusted under 35 U.S.C. 154(b) by 0 days.

(21) Appl. No.: 18/085,851

(22) Filed: Dec. 21, 2022

(51) Int. Cl.
| | | |
|---|---|---|
| *F01D 9/02* | (2006.01) | |
| *F23R 3/04* | (2006.01) | |
| *B33Y 80/00* | (2015.01) | |

(52) U.S. Cl.
CPC .............. *F01D 9/02* (2013.01); *F23R 3/04* (2013.01); *B33Y 80/00* (2014.12); *F05D 2220/31* (2013.01); *F05D 2220/32* (2013.01); *F05D 2240/128* (2013.01)

(58) Field of Classification Search
CPC .......... F23R 3/04; F01D 9/06; F05D 2220/32; F05D 2240/128
See application file for complete search history.

(56) References Cited

U.S. PATENT DOCUMENTS

| | | | | |
|---|---|---|---|---|
| 11,466,645 | B2 * | 10/2022 | Tomaru | ...................... F01D 1/20 |
| 2015/0037134 | A1 * | 2/2015 | Isaev | .......................... F01D 1/06 |
| | | | | 415/80 |

* cited by examiner

*Primary Examiner* — Courtney D Heinle
*Assistant Examiner* — Danielle M. Christensen
(74) *Attorney, Agent, or Firm* — Georgiy L. Khayet

(57) ABSTRACT

An integrated nozzle set for injecting a substance into a turbine is provided. The nozzle set includes an outer nozzle container arranged around a part of a circle and an inner nozzle container having a first part arranged around a remaining part of the circle and a second part concentric with the outer nozzle container. The nozzle set further includes a diaphragm connected to the inner nozzle container and configured to seal a cavity of the turbine, a flange having spokes connected to the inner nozzle container, a set of nozzles, and collectors inserted into the outer nozzle container and configured to collect a substance. The nozzles include a first group of nozzles disposed in the outer nozzle container, a second group of nozzles disposed in the first part of the inner nozzle container, and a third group of nozzles disposed in the second part of the inner nozzle container.

20 Claims, 9 Drawing Sheets

NOZZLE SET

TECHNICAL FIELD

This disclosure generally relates to gas and steam turbines and, more specifically, to nozzle sets for gas and steam turbines that can be used in turbopumps for liquid propellant engines and feeding turbopumps of steam turbines.

BACKGROUND

Nozzle sets of turbines are used for injecting gas or steam into rotor blades. There is a known turbine nozzle set (referred herein to as a nozzle set A) used in the turbopump of the RD-861K liquid-propellant rocket (LPR) engine. The nozzle set A consist of two annular nozzle containers, specifically, an inner nozzle container and an outer nozzle container concentric with each other. Each of these nozzle containers include a group of nozzles disposed evenly around the axis of the nozzle set. The nozzles disposed inside the inner nozzle container have a different angle of rotation than the nozzles disposed inside the outer nozzle container. The nozzle set A can be made of welded parts and is welded to a pump housing at the conical walls with straight generatrixes. The inner nozzle container includes a horizontal inlet pipe branch.

The nozzle set A has the following disadvantages. The first disadvantage is the presence of a large number of welded joins, which makes it difficult to manufacture and increases the weight of the nozzle set due to the weld reinforcement from the deposited metal, reduces reliability, and leads to a longer manufacturing cycle. Additionally, because the nozzle set is made of a heat-resistant alloy, welding is needed to connect the nozzle set to a pump casing. Accordingly, the pump casing needs to be manufactured from steel, which results in an additional increase in the weight of the turbopump unit.

The second disadvantage is the use of a large number of stamped parts, the manufacture of which requires special dies. This increases preparation time and manufacturing time and significantly increases the costs of manufacturing, especially in small-scale production, which is most typical for LPR turbopump units and feeding turbopumps for steam turbines.

The third disadvantage is that the shape of a workpiece in which the nozzles are made is a simple solid of revolution, and manufactured, for example, by machining. The shape of the workpiece does not follow the contour of the nozzles. This results in an increase in the weight of the structure of the nozzle set.

The fourth disadvantage is that the forces caused by the thermal deformations of the nozzle set occurring during the operation of the turbine are transmitted from the nozzle set to the pump housing through the conical walls. This leads to the deformation of the pump housing and bearing misalignment and, as a result, decreases the service life of the pump housing.

The fifth disadvantage is that the inlet pipe branch is disposed in the inner nozzle container horizontally against the side of the pump. This forces a manufacturer to weld the nozzle set and the pump housing because there is not enough space to make another type of connection, for example, a demountable flange. In addition, this approach leads to the inability to implement such turbine nozzle sets in turbopumps with a ratio $Dt/Dn \leq 1.5$, where $Dt$ is of the diameter of the turbine and $Dn$ is the diameter of pump wheels, because the pump housing would hinder the placement of the inlet pipe branch.

Partially, these shortcomings can be solved in another known turbine nozzle set (referred herein to as nozzle set B). The nozzle set B consists of a single nozzle container, a flange and a thin-walled diaphragm for mounting with a pump, where the nozzle box, the flange and the thin-walled diaphragm are welded parts. The connection with the pump casing is carried out through the flange and the diaphragm. The connection is demountable and can be carried out using studs with nuts or bolts. The walls of the flange and the diaphragm have a curvilinear contour in the cross section through the axis of rotation of the flange and diaphragm. The flange is carried out as a solid of revolution. The walls of the flange include holes to reduce the weight of the nozzle set B. The diaphragm includes dent stampings to reduce transmission of the forces caused by thermal deformations of the nozzle set to the pump housing. This approach helps to prevent distortion in the bearing and, thereby, increases the service life and reliability of the bearing. Additionally, the nozzle set B is simpler than the nozzle set A described above because the flange is dismountable from the pump casing. This results in reducing the number of welds. Such a simplification of the design increases the reliability and reduces the time and cost of manufacturing. At the same time, it becomes possible to make the pump housing from an aluminum alloy and, thereby, reduce the weight of the turbopump unit.

However, the nozzle set B still includes a large number of welded and stamped parts. Specifically, the nozzle set B has a new part referred to as a diaphragm, which is implemented in the form of a welded and stamped part. This makes the nozzle set B complex, expensive, heavy, and results in an increase of manufacturing cycle and reduces reliability.

In addition, the nozzle set B includes only one nozzle container which is disadvantageous as compared to the nozzle set A. Due to the presence of the flange, an addition of the inner nozzle container concentric to the outer nozzle container can be possible only for turbopump units, in which the turbine wheel diameter $Dt$ is much larger than the pump impeller diameter $Dn$ (for example, $Dt/Dn \geq 2$). In such turbopump units, there is sufficient space under the inner nozzle container for tightening fasteners on the flange. If $Dt/Dn < 2$, the detachable connection between the flange and the pump casing needs to be changed to a welded connection due to the insufficient space for tightening the fasteners on the flange. This results in the appearance of additional welds and stamped parts, further complicates the manufacturing, and increases the costs of the nozzle set. Usage of welding makes it necessary to change the material of the pump housing from aluminum to steel. This also results in increasing the weight of the nozzle set. The use of welding reduces the reliability and increases the production time of the nozzle set.

Accordingly, there is a need for a design of a nozzle set that allows reducing the weight and manufacturing time of the nozzle set and increasing the reliability of the nozzle set.

SUMMARY

This section is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

In an example embodiment, an integrated nozzle set for injecting a substance into a turbine, which is also referred herein to as a nozzle set, is provided. The nozzle set is a monolithic part that includes two annular nozzle containers having groups of nozzles. One nozzle container is referred herein to as an outer nozzle container and is located not along the entire circumference of the nozzle set, but only on a part of the circumference. Another nozzle container is referred herein to as an inner nozzle container and may include two parts. The first part of the inner nozzle container is located on the part of the remaining circumference that is not occupied by the outer nozzle container. The second part of the inner nozzle container is located under the outer nozzle container concentrically to the outer nozzle container. The second part of the inner nozzle container has a common wall with the outer nozzle container. In an example embodiment, the outer nozzle container can have the common wall with the first part of the inner nozzle container. The area of cross sections of the nozzle containers may be variable.

Each nozzle container may have its own inlet pipe branch. The inlet pipe branch of the inner nozzle container is located in the first part of the inner nozzle container. The inlet pipe branches may be disposed relative to the nozzle set at various angles of axes of the inlet pipe branches.

The nozzle containers may be thin-walled shells of a predetermined shape that enables the nozzle containers to be manufactured by three-dimensional (3 D) printing without the need to provide technological supports in internal cavities of the nozzle containers.

The nozzles may be thin-walled shells in the form of bodies of revolution. The nozzles can be arranged in groups in the nozzle containers. The groups of nozzles in each nozzle container can be placed evenly around the circumference of the nozzle set. The nozzles can have legs that serve as technological support in 3 D printing.

The nozzles that are located in the second part of the inner nozzle container may have collectors also referred herein to as inlet collectors. The collectors may penetrate into the cavity of the outer nozzle container through the common wall of the outer nozzle container and the inner nozzle container. The walls of the collectors may prevent a gas flow from one nozzle container to another. The collectors are thin-walled shells of a predetermined shape that enables the collectors to be manufactured by 3 D printing without the need to provide technological support. The walls of the nozzle containers, nozzles, and collectors can have a variable thickness.

The nozzle set may include a thin-walled diaphragm and a flange configured to connect the diaphragm to a pump casing of a pump. The diaphragm may hermetically seal the turbine cavity. The cross-section of the diaphragm may have a smoothly curved profile.

The nozzle set may include a flange for attachment of the nozzle set to the pump casing. The flange may be connected to the nozzle containers using spokes. In an example embodiment, the cross section of the spokes may have a straight profile or a curved profile.

In an example embodiment of configuration, the nozzle set may have a flange for attachment of the nozzle set to the body of the pump. The flange may be connected to the nozzle containers by means of the spokes and the diaphragm. This eliminates the need for providing a flange for attaching the diaphragm to the pump casing as the diaphragm is made integrally with the rest of elements of the nozzle set.

Additional objects, advantages, and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

Embodiments are illustrated by way of example and not limitation in the figures of the accompanying drawings, in which like references indicate similar elements and in which.

DETAILED DESCRIPTION

Figure 1A:
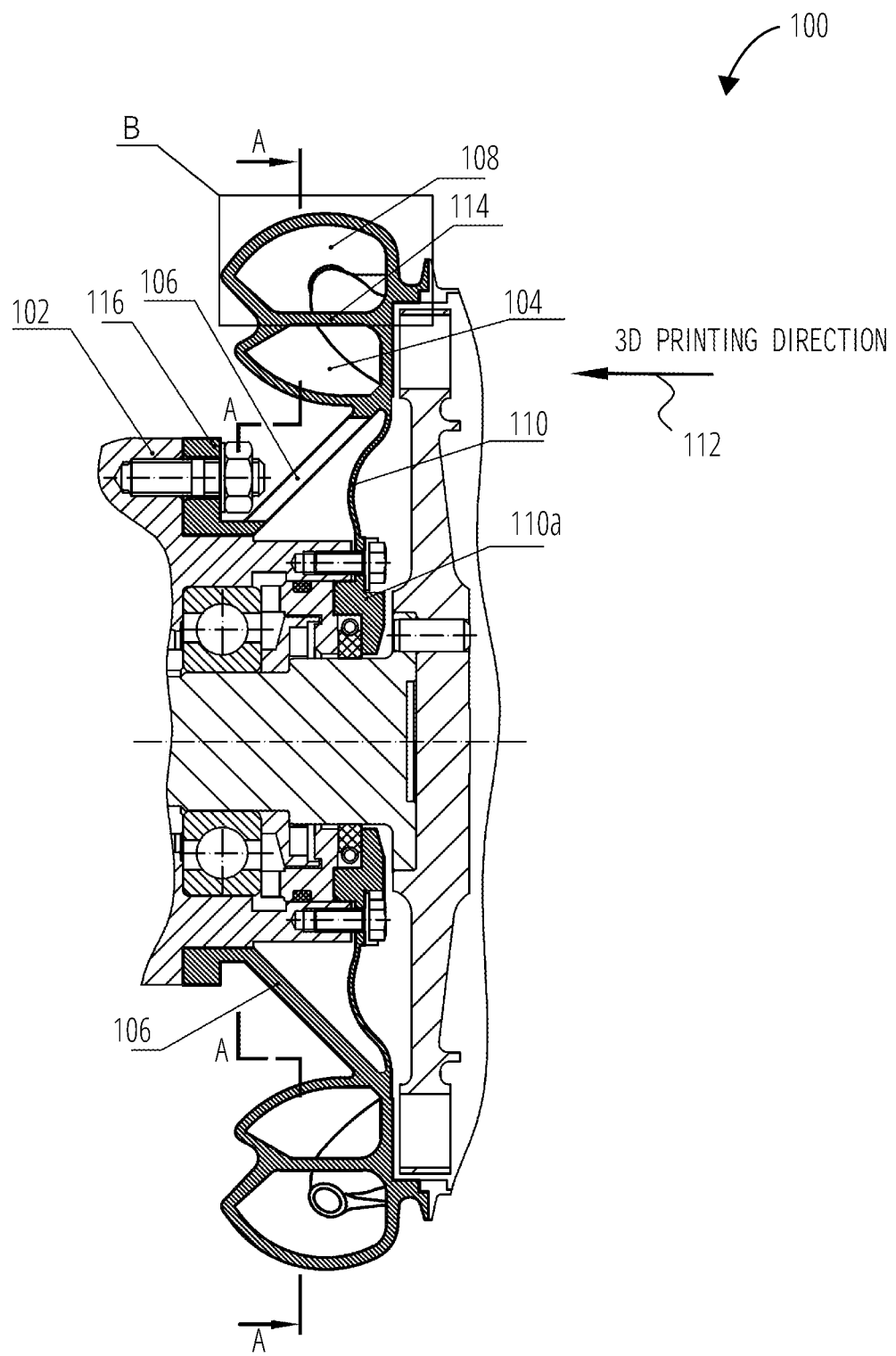
FIG. 1A is a cross-section view of a nozzle set attached to the body of a pump in a turbine, according to an example embodiment.

The following detailed description of embodiments includes references to the accompanying drawings, which form a part of the detailed description. Approaches described in this section are not prior art to the claims and are not admitted to be prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

Generally, the embodiments of this disclosure relate to nozzle sets that can be used in turbopump units for rocket engines and feed turbopumps of steam turbines. Embodiments of this disclosure facilitate solving problems experienced by existing nozzle sets. Specifically, embodiments of this disclosure allow reducing weight of nozzle sets, reducing manufacturing time of nozzle sets, increasing the reliability of the structure of nozzle sets, eliminating forces caused by thermal deformations, and reducing the manufacturing cost of nozzle sets.

A nozzle set disclosed herein can be made as an integrated part that includes two nozzle containers (an inner nozzle container and an outer nozzle container), groups of nozzles, inlet pipe branches to both nozzle containers, a flange with spokes for connecting the nozzle set to the pump housing, and a thin-walled diaphragm having a further flange and configured to seal the turbine cavity airtight. The further flange of the diaphragm can be configured to be connected to the pump housing. The nozzle set can be manufactured using additive technologies (such as 3 D printing).

The outer nozzle container can be made on a part of a circle (i.e., the circumference of the nozzle set) and not occupying the entire circle. The inner nozzle container can consist of two parts. The first part of the inner nozzle container can be made on the remaining free part of the circle. This part of the inner nozzle container may include an inlet pipe branch. The second part of the inner nozzle container may be concentric to the outer nozzle container and located under the outer nozzle container and closer to the center of the circle. The second part of the inner nozzle container may have a common wall with the outer nozzle container. In addition to separating cavities of the inner nozzle container and the outer nozzle container, the common wall may serve as a technological support for 3 D printing. Each nozzle container may have a predetermined profiled shape which enables 3 D printing the nozzle container without technological support.

The nozzles can also be made in the form of thin-walled shells. In an example embodiment, the nozzles can have legs. The legs can serve as technological support in 3D printing. The nozzles located in the second part of the inner nozzle container (the part that is concentric with the outer nozzle container) may correspond to inlet collectors inserted into the cavity of the outer nozzle container. However, the walls of the collectors may prevent the flow of gaseous substances from the outer nozzle container to the inner nozzle container and from the inner nozzle container to the outer nozzle container. Each collector may have a predetermined profiled shape, which enables 3 D printing the collector without the need to provide technological supports.

In an example embodiment, an internal side of one of the outer nozzle container and the inner nozzle container may form a contour in a plane parallel to the direction of the 3D printing. The contour may include a base, a first curve extended from the base, and a second curve extended from the base. The first curve and the second curve may have diverging sections and converging sections and may converge on a single point. An angle between the direction of the 3 D printing and a tangent to the contour at a point at the converging sections may not exceed a limit angle enables the 3 D printing of the outer nozzle container without using a support structure.

In a further example embodiment, an internal side of one of the collectors may form a contour in a plane parallel to the direction of the 3 D printing. The contour may include a base, a first side curve extended from the base, and a second side curve extended from the base. The first side curve and the second side curve may have diverging sections and converging sections and may converge to a single point. An angle between the direction of the 3 D printing and a tangent to the contour at a point at the converging sections may not exceed a limit angle enabling the 3 D printing of the collectors without using a support structure.

In a further example embodiment, an external side of one of the collectors may form a contour in a plane parallel to the direction of the 3 D printing. The contour may include a base, a first side curve extended from the base, and a second side curve extended from the base. The first side curve and the second side curve may have diverging sections and converging sections and may converge on a single point. An angle between the direction of the 3 D printing and a tangent to the contour at a point at the diverging sections may not exceed a limit angle enabling the 3 D printing the collectors without using a support structure.

To decrease the weight of nozzle set, the nozzle containers may have variable cross-sections and the walls of the nozzle containers, nozzles, and collectors can be made of a variable thickness.

A free space between the spokes can be utilized for disposing nuts used for connecting the nozzle set to the pump casing. This can make the structure of the nozzle set more compact and lighter than the structure of existing nozzle sets.

Though nozzle sets disclosed herein include two nozzle containers as some of existing nozzle sets, the nozzle sets disclosed herein have the following elements distinctive from the existing nozzle sets:

1) The nozzle set is manufactured in the form of a single integrated part.

2) Nozzle containers are thin-walled shells.

3) The shape of nozzle containers may enable 3 D printing of the nozzle containers without using technological supports. Specifically, the contour line, which is formed by the inner walls of the nozzle containers in the sectional plane that is parallel to the direction of 3D printing, has a base and two side lines that extend from the base, have diverging and converging sections, and close at one point. On converging sections, the angles between the tangent at any point of the contour line to the direction of 3 D printing do not exceed the maximum limit value, above which it is necessary to apply technological supports for 3D printing. With the current level of 3 D printing technology, this angle is approximately 45° and may slightly deviate up or down depending on a particular embodiment.

4) Nozzles are made in the form of a thin-walled shell.

5) One of the nozzle containers (the outer nozzle container) is made on a part of a circle, and not around the entire circle. The first part of the second nozzle container (the inner nozzle container) is made on the remaining free part of the circle. An inlet pipe branch of the inner nozzle container is also made within the remaining free part of the circle. The second part of the inner nozzle container is concentric with the outer nozzle container and located under the outer nozzle container towards the center of the circle.

6) The outer nozzle container and the second part of the inner nozzle container (the part that is concentric with the outer nozzle container) have a common wall.

7) The nozzles disposed in the second part of the inner nozzle container (the part that is concentric with the outer nozzle container) correspond to particular inlet collectors that penetrate into the cavity of the outer nozzle container. The inlet collectors are thin-walled shells. The shape of the inlet collectors enables 3 D printing of the inlet collectors without using technological supports.

8) The flange for mounting the nozzle set on the pump housing is connected to the nozzle containers using spokes. The spokes are arranged in a circle around the axis of the nozzle containers and there is a free gap between the spokes.

9) The outer nozzle container can have common walls with the first part of the inner nozzle container.

10) Walls of the nozzle containers, inlet collectors, and nozzles can have a variable thickness.

11) Nozzle containers can have a variable cross section.

Referring now to the drawings, FIG. 1A depicts a cross-section view of a nozzle set 100 configured to be attached to a body of a pump in a turbine, according to one example embodiment of present disclosure. The nozzle set 100 may include an inner nozzle container 104, an outer nozzle container 108, a flange 116 with spokes 106, and a diaphragm 110. In an example embodiment, the diaphragm 110 may have a further flange shown as a flange 110a. The outer nozzle container 108 and the inner nozzle container 104 may have a thin-walled shape. The wall thickness of each of the inner nozzle container 104 and the outer nozzle container 108 may be variable. The nozzle set 100 can be made as an integrated part using additive manufacturing (3 D printing). The arrow 112 depicts the direction of the 3 D printing of the nozzle set 100 as an integrated part.

The inner nozzle container 104 and the outer nozzle container 108 may have a common wall 114. The flange 116 may be connected to the spokes 106, which may be connected to the inner nozzle container 104. The flange 116 may be configured to be connected to a pump of the turbine by connecting to the pump casing 102.

The diaphragm 110 may be connected to the inner nozzle container 104. The diaphragm 110 is used to hermetically seal a cavity of the turbine. The diaphragm 110 may be thin walled. The diaphragm 110 may have a flange 110a. The flange 110a can be configured to be attached to a pump casing 102. The diaphragm 110 may be connected to the pump casing 102 through the flange 110a. The diaphragm 110 with the flange 110a are needed to ensure hermetic sealing of the turbine cavity.

The cross-sectional profile of the diaphragm 110 has a smoothly curved contour, due to which the diaphragm 110 can deform in response to thermal expansion and pressure in the turbine cavity, but at the same time may not create forces to be transmitted to the pump casing 102. Thus, the diaphragm 110 is not a load-bearing element of the nozzle set 100.

To provide the load-bearing attachment of the nozzle set 100 to the pump casing 102, the nozzle set 100 may have the flange 116 with the spokes 106. The spokes 106 may be configured to be connected to a pump of the turbine. The spokes 106 may connect the flange 116 with the inner nozzle container 104 and the outer nozzle container 108.

In an example embodiment, the flange 116 may be connected to the nozzle containers by means of the spokes 106 and the diaphragm 110. This eliminates the need for providing the flange 110a for attaching the diaphragm 110 to the pump casing 102 as the diaphragm 110 may be made integrally with a housing of the nozzle set. Thus, in this embodiment, the flange 116 may be connected to the inner nozzle container 104 using the spokes 106 and the diaphragm 110, which may be a single part with the housing of the nozzle set 100 (as described in detail with reference to FIG. 7).

Figure 1B:
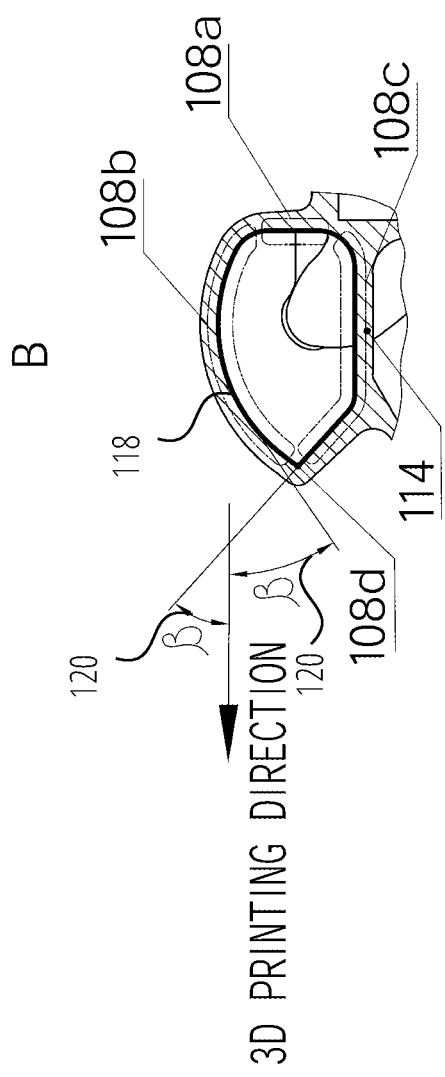
FIG. 1B is a detailed view of a part of a nozzle set shown in FIG. 1A, which depicts an outer nozzle container, according to an example embodiment.

FIG. 1B is a detailed view of a part B of the nozzle set 100 shown in FIG. 1A, which depicts an outer nozzle container, according to an example embodiment. FIG. 1B shows an example profiling of a closed contour 118 of the inner side of the wall of the outer nozzle container 108 in a plane parallel to the 3 D printing. The closed contour 118 has a base 108a, an apex 108d, and two side contour lines 108b and 108c extending from the base 108a and meeting at the apex 108d. The side contour lines 108b and 108c may have straight and curved sections. If moving in the direction of 3 D printing shown by the arrow 112 in FIG. 1A, the side contour lines 108b and 108c go from the base 108a and have diverging sections and converging sections, and finally converge to one point which is the apex 108d, thus forming the closed contour 118. The base 108a of the closed contour 118 can be a point which is the start of the 3 D printing, or a straight line (as in the embodiment shown in FIG. 1B) that is perpendicular to the 3 D printing direction and that is also the start of the 3 D printing. It is conditionally accepted that the converging section of one of lines of the closed contour 118 is a section on which the points of this line tend to approach the other line of the closed contour 118. Vice versa, the diverging section of one of the lines of the closed contour 118 is a section where the points of this line tend to move away from the other line of the closed contour 118 when viewed in the direction of 3 D printing.

If any part of the wall of one of the nozzle containers also belongs to the other nozzle container (as the common wall 114), both sides of this wall are inner sides and both of the sides form the side lines of the closed contours of the respective nozzle containers.

The condition for the absence of technological supports inside the nozzle containers is ensured by selecting such a shape of the side lines of the closed contours in which the angles $\beta$ 120 between the tangent at any point of the line of the closed contour 118 to the 3 D printing direction do not exceed the limit values in the converging sections. The current level of 3D printing technology enables achieving angles $\beta$ 120 of approximately 45° that may deviate slightly up or down depending on the particular embodiment. In the embodiment shown in FIG. 1B, the side lines of the closed contours 118 of the cross-sectional profiles of the inner nozzle container 104 and the outer nozzle container 108 have both straight sections, including the common wall 114, and curved sections. Thus, this shape of the nozzle containers enables manufacturing the nozzle containers without the need to provide additional technological support inside the nozzle containers.

Figure 2:
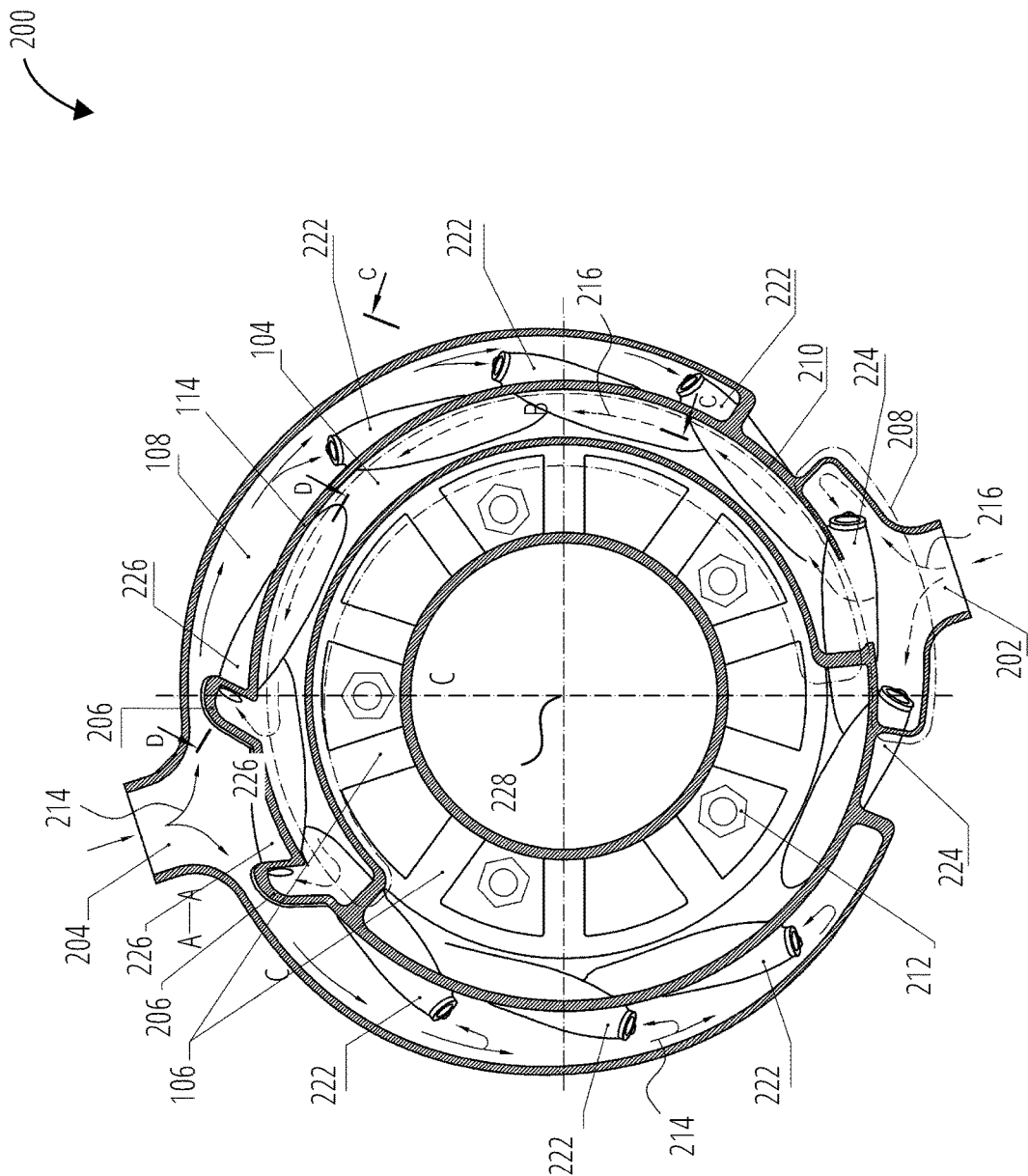
FIG. 2 is a cross-section view of a nozzle set along a cutting plane A-A shown in FIG. 1A.

FIG. 2 depicts a cross-section view 200 of the nozzle set 100 along a cutting plane A-A shown in FIG. 1A. The outer nozzle container 108 may be arranged around a part of a circle (i.e., the circumference of the nozzle set 100). As shown in FIG. 2, the outer nozzle container 108 has an inlet pipe branch 204. The inlet pipe branch 204 is used to supply a working substance (a gas or a steam) into the outer nozzle container 108. FIG. 2 shows that the outer nozzle container 108 has a circular shape and is located around an axis 228 of the turbine not along the entire circumference, but only on a part of the circumference.

The inner nozzle container 104 may have a first part 208 and a second part 210. The first part 208 of the inner nozzle container 104 may be arranged around a remaining part of the circle (i.e., on the remaining free part of the circumference of the nozzle set 100). The inner nozzle container 104 has an inlet pipe branch 202. The inlet pipe branch 202 is used to supply the working substance into the inner nozzle container 104. The inlet pipe branch 202 can be located at the first part 208 of the inner nozzle container 104.

The second part 210 of the inner nozzle container 104 may be concentric with the outer nozzle container 108 and disposed closer to a center of the circle than the outer nozzle container 108. Specifically, the second part 210 may be located concentrically under the outer nozzle container 108 towards the center of the circle. The second part 210 of the inner nozzle container 104 has a common wall 114 with the outer nozzle container 108. The common wall 114, in addition to separating the inner nozzle container 104 and the outer nozzle container 108, also serves as the technological support when 3 D printing the inner nozzle container 104 and the outer nozzle container 108.

The inlet pipe branch 202 and the inlet pipe branch 204 can be made with different installation angles. In the example embodiment shown in FIG. 2, the axes of inlet pipe branch 202 and the inlet pipe branch 204 are perpendicular to the axis 228 of the turbine.

The shape of the inner nozzle container 104 and the outer nozzle container 108 enables 3 D printing of the inner nozzle container 104 and the outer nozzle container 108 without using technological supports in the internal cavities of the inner nozzle container 104 and the outer nozzle container 108. This shape is ensured by the fact that each nozzle container has a predetermined profiled closed contour in the cutting plane parallel to the 3 D printing direction. The direction of the 3 D printing is shown by the arrow 112 in FIG. 1A. The predetermined profiled closed contour is formed by the inner side of the wall of each nozzle container.

Still referring to FIG. 2, the nozzle set 100 may have a set of nozzles including a first group of nozzles (nozzles 222) disposed in the outer nozzle container 108, a second group of nozzles (nozzles 224) disposed in the first part 208 of the inner nozzle container 104, and a third group of nozzles (nozzles 226) disposed in the second part 210 of the inner nozzle container 104. Specifically, the outer nozzle container 108 may have nozzles 222 located in the outer nozzle container 108, through which the working substance reaches the blades of a wheel of the turbine. The nozzle 222 may extend through the common wall 114 and through the cavity of the second part 210 of the inner nozzle container 104. The inner nozzle container 104 may have nozzles 224 in the first part 208 and nozzles 226 in the second part 210.

The nozzle set 100 may have collectors 206 corresponding to the third group of nozzles (nozzles 226). The collectors 206 may have a variable cross-section. The collectors 206 may be inserted into the outer nozzle container 108 and configured to collect the substance. The nozzles 226 traverse the common wall 114 and, in view of this, the nozzles 226 have the collectors 206 at the inlet of the nozzle 226 through which the working substance flows from the inner nozzle container 104 to the nozzles 226. The collectors 206 have a thin-walled shape and are thin-walled shells that penetrate into the cavity of the outer nozzle container 108 through the common wall 114, but the walls of the collectors 206 prevent the gas from flowing from one nozzle container to another.

The collectors 206 are located inside the outer nozzle container 108. Therefore, the collectors 206 have a shape that enables manufacturing the collectors 206 by 3 D printing without using technological supports. To achieve such a shape of the collector 206, the collector 206 is profiled in such a way that, when the collector 206 is cut in any plane parallel to the direction of 3 D printing, the lines of the obtained contours enable the 3 D printing without technological supports.

All elements of the nozzle set 100, namely the outer nozzle container 108, the inner nozzle container 104, the diaphragm 110, the flanges 116 and 110a, the spokes 106, the nozzles 222, 224, 226, and the collectors 206, are manufactured by 3 D printing in a single technological cycle.

FIG. 2 further shows a side view of the spokes 106. The spokes 106 are disposed around the axis 228 of the circle and have space intervals between each other. Specifically, there is a free space between the spokes 106 for disposing nuts 212 for connecting the flange 116 and the pump casing 102 (shown in FIG. 1A).

The nozzles 222, 224, and 226 may have a thin-walled shape and can be made in the form of thin-walled circular shells. The inner nozzle container 104 and the outer nozzle container 108 can be made with a variable cross section. The walls of the inner nozzle container 104 and the outer nozzle container 108, the nozzles 222, 224, 226, and the collectors 206 can be of variable thickness.

The nozzle set works as follows. The working substance of the turbine enters through the inlet pipe branch 204 into the outer nozzle container 108 and through the inlet pipe branch 202 into the inner nozzle container 104. In the outer nozzle container 108, the working substance is distributed over the nozzles 222 as shown by arrows 214 with solid lines and is provided, via outlets of the nozzles 222, to wheel blades of the turbine.

Distribution of the working substance within the inner nozzle container 104 is shown by arrow 216. In the inner nozzle container 104, a part of the working substance immediately enters the nozzles 224 located in the first part 208 of the inner nozzle container 104, and the rest of the working substance enters the second part 210 of the inner nozzle container 104 (located concentrically to the outer nozzle container 108) and is distributed over the nozzles 226 through the collectors 206. The collectors 206 are introduced into the cavity of the outer nozzle container 108, but the walls of the collectors 206 prevent the flow of working substances from the outer nozzle container 108 to the inner nozzle container 104 and, vice versa, from the inner nozzle container 104 to the outer nozzle container 108.

The integrated structure of the nozzle set 100, which does not have welds, where all elements of the flow path—nozzle containers, nozzles, and collectors—are made in the form of thin-walled shells, and where the connection with the flange is made using spokes, is optimal in terms of weight and reliability. 3 D printing reduces the manufacturing time by several times compared to existing methods, does not require expensive dies for die forging and welding equipment, and by so ultimately reduces the cost of manufacturing.

Because the flow of the working substance in the nozzle containers is constantly decreasing due to the fact that the working substance constantly gives some of its part to the nozzles, it implies that the cross section of the nozzle containers can gradually decrease. The manufacturing method of 3 D printing enables this to be done without any complication. However, at the same time, the shape of the nozzle containers enables 3 D printing of the nozzle containers without the need to provide technological supports in internal cavities of the nozzle containers. The nozzle containers with a decreasing cross-section further enable reducing the weight of the structure of the nozzle set 100.

Another opportunity for reducing the weight of the nozzle set 100 is making the walls of nozzle containers, nozzles, and collectors of variable thickness to obtain an equal strength structure because the 3 D printing enables making walls from about 0.3 mm and higher. The lower limit of 0.3 mm can be decreased in the future with further development in 3 D printing technology.

Based on the foregoing, it can be concluded that the structure of the nozzle set 100 can be optimized in terms of wall thicknesses and the shape of the nozzle containers. At the same time, the structure of the nozzle set 100 does not complicate or increase the cost of manufacturing by 3 D printing.

Figure 3:
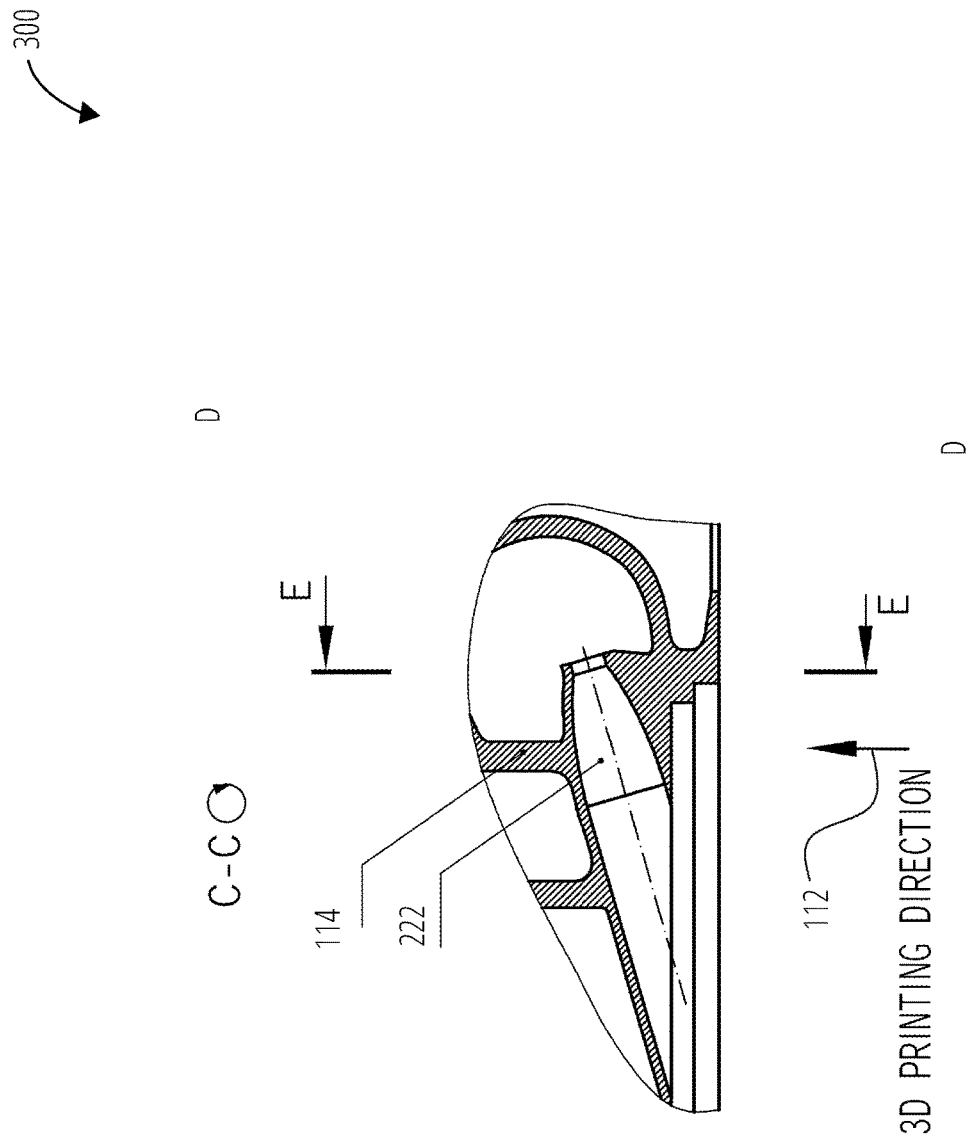
FIG. 3 is a partial cross-section view of a nozzle set along a cutting plane C-C shown in FIG. 2, according to an example embodiment.

FIG. 3 depicts a cross-section view 300 of a nozzle 222 of the outer nozzle container 108 along a cutting plane C-C shown in FIG. 2. As shown in FIG. 3, the nozzle 222 may pass through the common wall 114. The arrow 112 shows the direction of 3 D printing. The nozzle 222 may be inclined at a predetermined angle with respect to a plane orthogonal to the direction of 3 D printing.

Figure 4:
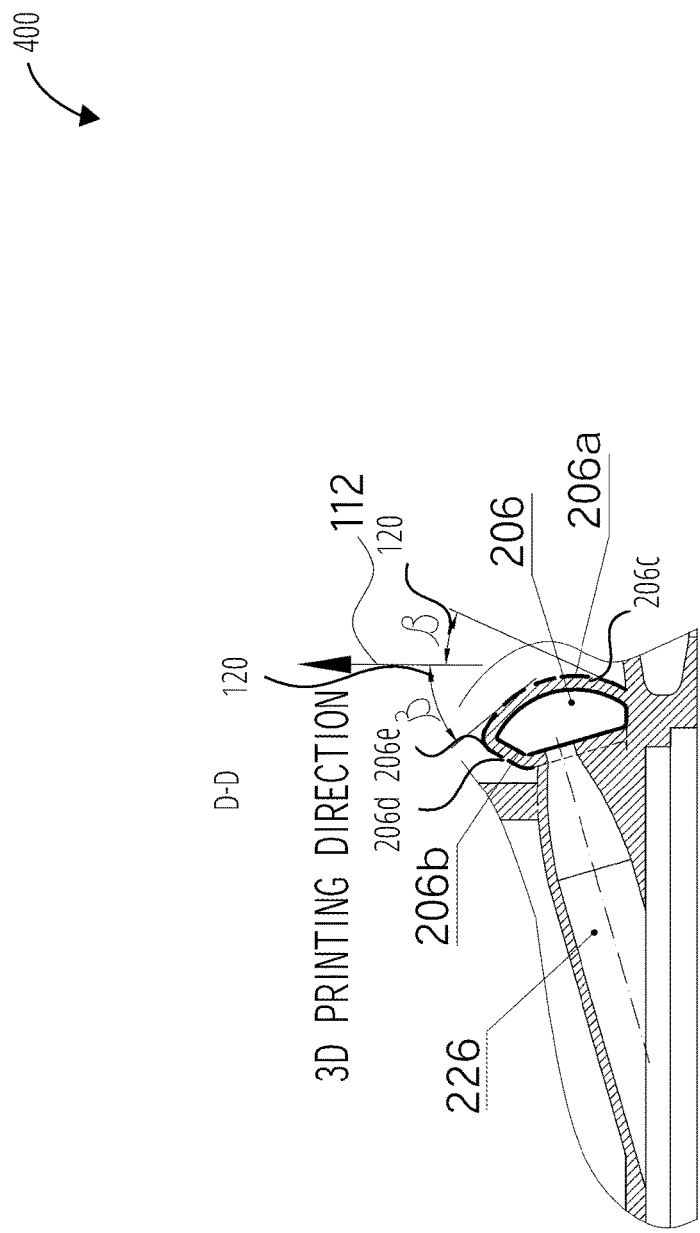
FIG. 4 is a partial cross-section view of a nozzle set along a cutting plane D-D shown in FIG. 2, according to an example embodiment.

FIG. 4 depicts a cross-section view 400 of a nozzle 226 of the inner nozzle container 104 along a cutting plane D-D shown in FIG. 2. The inlet of the nozzle 226 is directed to the collector 206. The arrow 112 shows the direction of 3 D printing.

FIG. 4 further shows a section of the collector 206 in the plane parallel to the direction of 3 D printing. When cut, two contours 206a and 206b are formed. The first contour 206a is formed by the outer side of the wall (shown as a broken line). The second contour 206b is formed by the inner side of the wall (shown as a solid thick line). The contour 206b is a closed contour. To fulfill the condition for the 3 D printing without technological support, the contour 206b is subject to the same requirements as the closed contour 118 for the nozzle containers described with reference to FIG. 1B.

In the embodiment shown in FIG. 4, the contour 206a is not closed, although it may be closed in some example embodiments. The contour 206a consists of two lines 206c and 206d and an apex 206e. Moving in the direction of 3 D printing, the lines 206c and 206db start at any elements of the nozzle set 100 that are already 3 D printed. In this embodiment, these are the walls of the outer nozzle container 108 inside which the collectors 206 are to be located. Both lines 206c and 206d may start from the same point, in which the contour 206a is to be closed. Then, the lines 206c and 206d go in the direction of 3 D printing and finally merge into one point which is the apex 206e.

The lines 206c and 206d, similarly to the lines of the nozzle containers described with reference to FIG. 1B, may have straight sections and curved sections and may have convergent sections and divergent sections.

The condition for the absence of technological supports is ensured by selecting such a shape of the lines 206c and 206d of the contour 206a, in which the angles β 120 between the tangent at any point of any of the lines 206c and 206d to the 3 D printing direction do not exceed the predetermined limit values in divergent sections. The current level of 3 D printing technology allows achieving angles β 120 of approximately 45° that may deviate slightly up or down depending on the particular embodiment.

Figure 5:
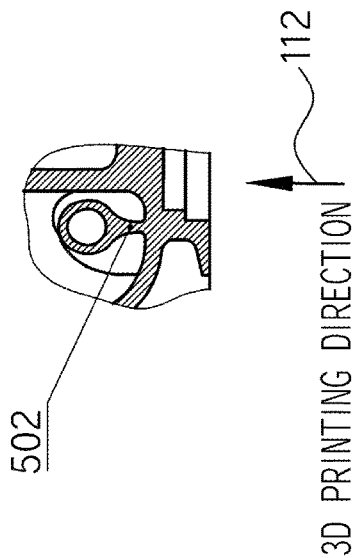
FIG. 5 is a partial cross-section view of a nozzle set along a cutting plane E-E shown in FIG. 3, according to an example embodiment.

FIG. 5 depicts a cross-section view 500 of a nozzle 222 of the outer nozzle container 108 along a cutting plane E-E shown in FIG. 3. The arrow 112 shows the direction of 3D printing. Each nozzle 222 may have an optional leg 502 that can serve as a technological support (a support structure) in 3 D printing. The nozzle 222 may include the leg 502 in those embodiments where the angle 302 is less than needed for 3 D printing without technological supports. The shape of the leg 502 can be different. However, the optimal shape of the leg 502 may expand in the direction of 3 D printing. The leg 502 may have a variable thickness.

Figure 6:
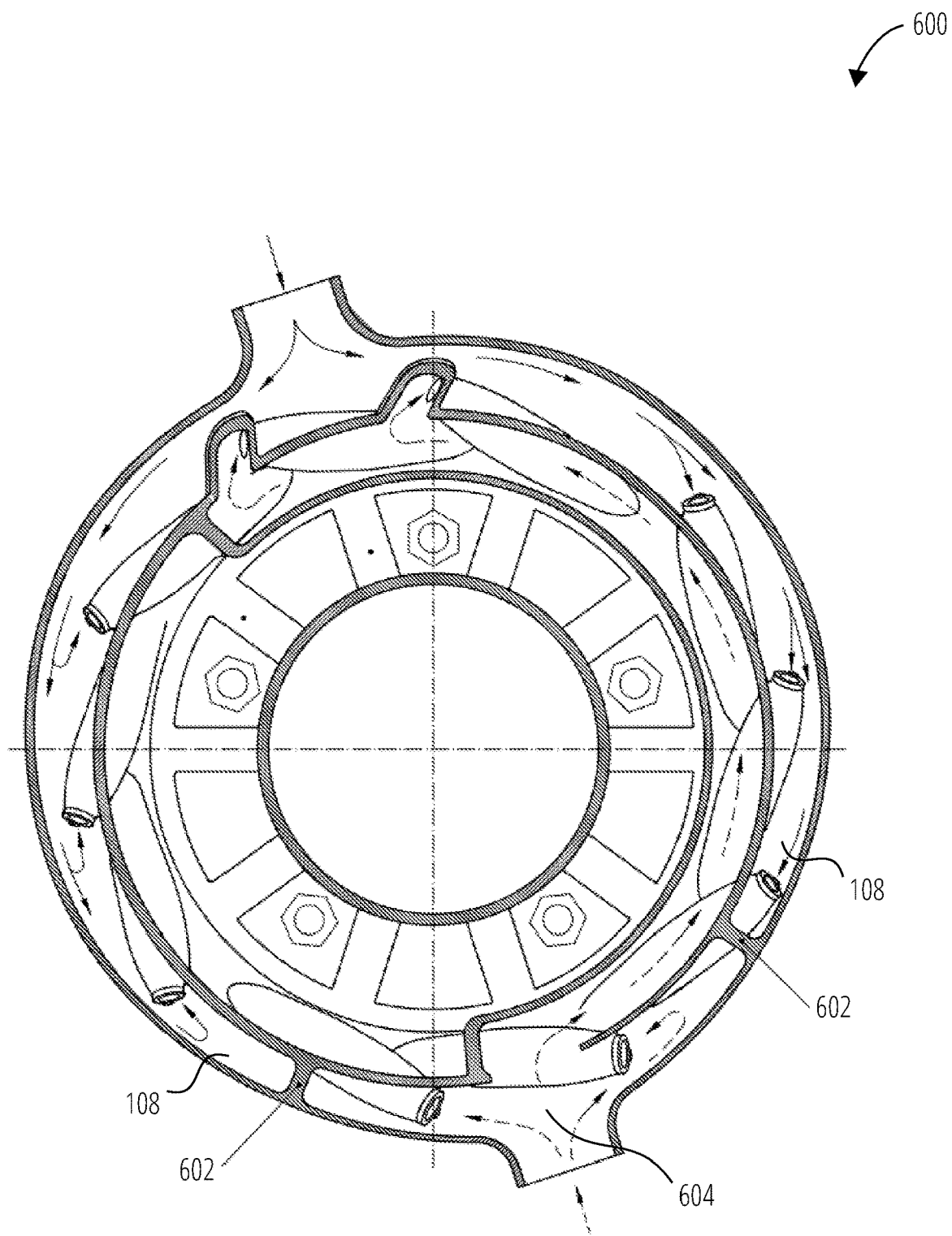
FIG. 6 is a cross-section view of a nozzle set, according to an example embodiment.

FIG. 6 is a cross-section view of a nozzle set 600, according to another example embodiment. The nozzle set 600 is similar to the nozzle set 100 with exception that the first part 604 of the inner nozzle container 104 has a common wall 602 with the outer nozzle container 108.

Figure 7:
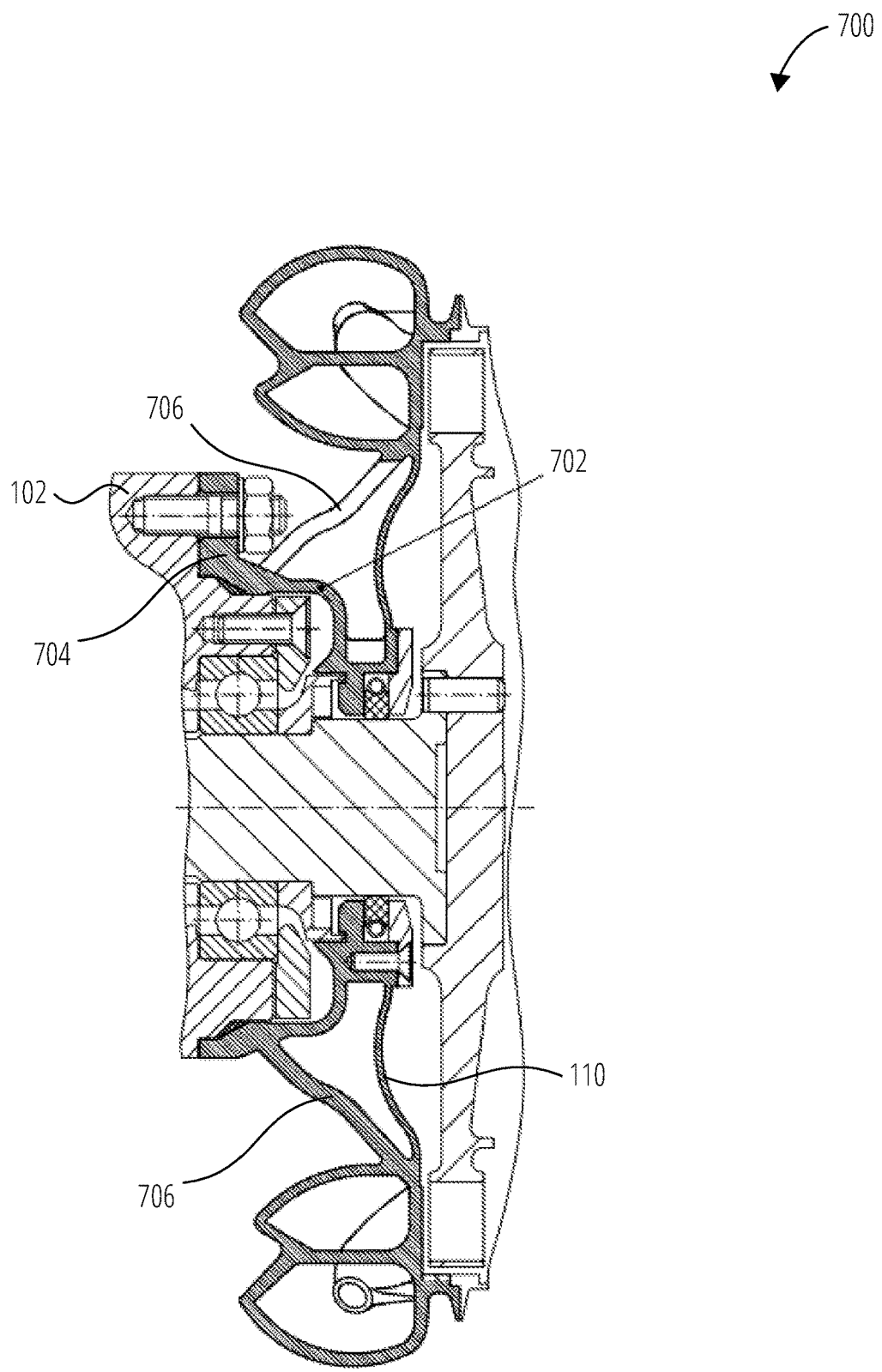
FIG. 7 is a cross-section view of a nozzle set, according to an example embodiment.

FIG. 7 is a cross-section view of a nozzle set 700, according to yet another example embodiment. The nozzle set 700 is similar to the nozzle set 100 with the exception that the nozzle set 700 includes a housing 702. The housing 702 includes a flange 704 for connecting the housing 702 to a pump casing 102. The presence of housing 702 may complicate the structure of the nozzle set; however, it may simplify the designing of a turbopump unit as whole.

Additionally, the spokes 706 of the nozzle set 700 can be made of a curvilinear shape. This can allow additionally decreasing transfer of forces due to the thermal distortion of the nozzle set 700 to the pump casing 102.

Figure 8:
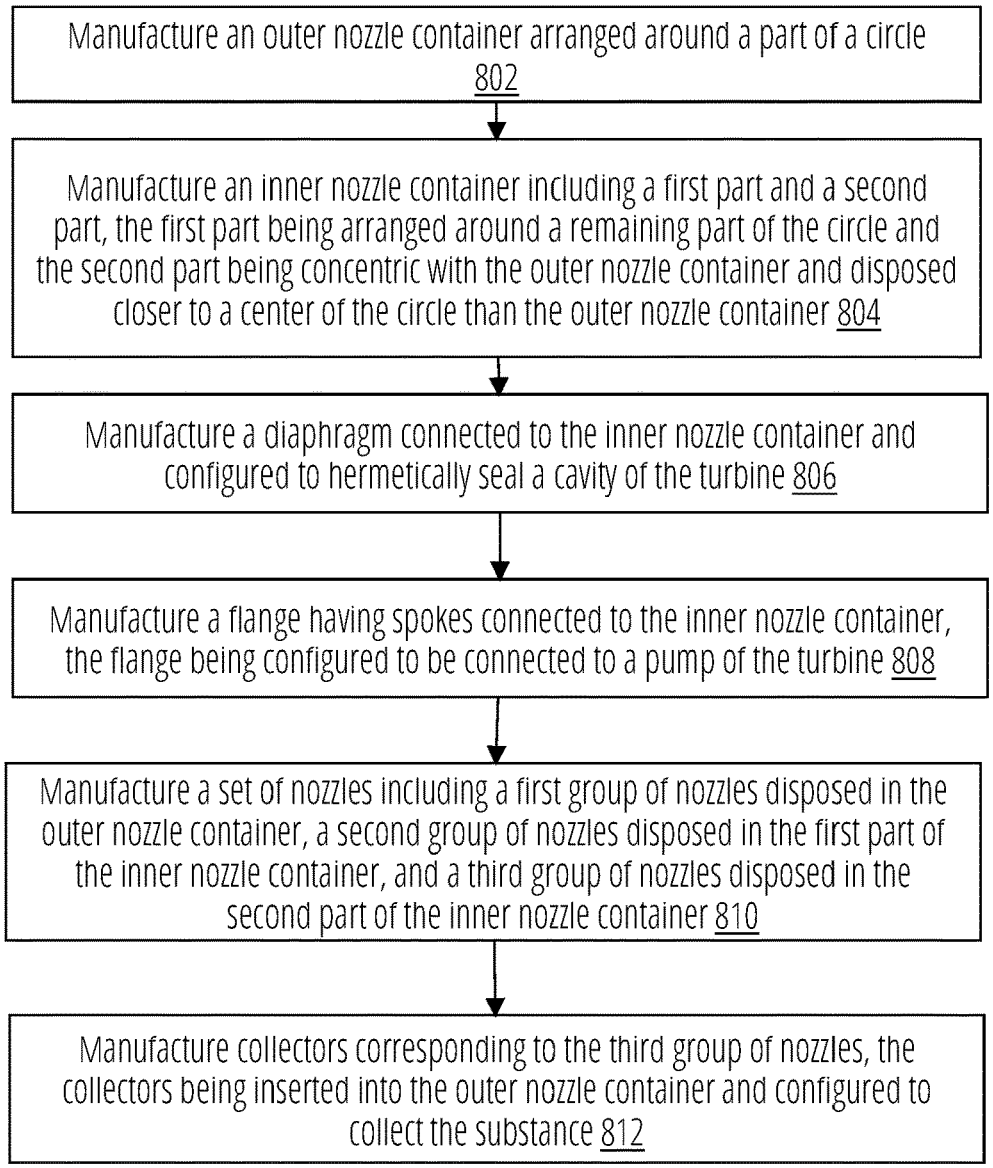
FIG. 8 illustrates a method for manufacturing an integrated nozzle set, according to an example embodiment.

FIG. 8 illustrates a method 800 for manufacturing an integrated nozzle set in accordance with one embodiment. In some embodiments, the operations of the method 800 may be combined and performed concurrently or in parallel. The method 800 may also include additional or fewer operations than those illustrated.

The method 800 may commence in block 802 with manufacturing an outer nozzle container arranged around a part of a circle. In block 804, the method 800 may proceed with manufacturing an inner nozzle container including a first part and a second part. The first part may be arranged around a remaining part of the circle and the second part may be concentric with the outer nozzle container and disposed closer to the center of the circle than the outer nozzle container. The method 800 may further include manufacturing a diaphragm connected to the inner nozzle container and configured to hermetically seal a cavity of the turbine in block 806. In block 808, the method 800 may proceed with manufacturing a flange that may have spokes connected to the inner nozzle container. The flange may be configured to be connected to a pump of the turbine.

In block 810, the method 800 may proceed with manufacturing a set of nozzles. The set of nozzles may include a first group of nozzles disposed in the outer nozzle container, a second group of nozzles disposed in the first part of the inner nozzle container, and a third group of nozzles disposed in the second part of the inner nozzle container. The method 800 may further include manufacturing collectors corresponding to the third group of nozzles in block 812. The collectors may be inserted into the outer nozzle container and configured to collect the substance.

All elements of the nozzle set, namely the outer nozzle container, the inner nozzle container, the diaphragm, the flanges, the spokes, the nozzles, and the collectors can be manufactured by additive manufacturing (3 D printing) in a single technological cycle. In an example embodiment, the operations shown in blocks 802-812 may be performed concurrently in the direction of the 3 D printing.

In an example embodiment, elements of the nozzle set may be manufactured from a powdery substance. The powdery substance may include a nickel-based metal powder for the additive manufacturing.

Thus, integrated nozzle sets for injecting a substance into a turbine are disclosed. While the present embodiments have been described in connection with a series of embodiments, these descriptions are not intended to limit the scope of the subject matter to the particular forms set forth herein. It will be further understood that the methods are not necessarily limited to the discrete components described. To the contrary, the present descriptions are intended to cover such alternatives, modifications, and equivalents as may be included within the spirit and scope of the subject matter as disclosed herein and defined by the appended claims and otherwise appreciated by one of ordinary skill in the art.

What is claimed is:

1. An integrated nozzle set for injecting a substance into a turbine, the integrated nozzle set comprising:
   an outer nozzle container arranged around a part of a circle;
   an inner nozzle container including a first part and a second part, the first part being arranged around a remaining part of the circle and the second part being concentric with the outer nozzle container and disposed closer to a center of the circle than the outer nozzle container;

a diaphragm connected to the inner nozzle container and configured to hermetically seal a cavity of the turbine;

a flange having spokes, the spokes being connected to the inner nozzle container, the flange being configured to be connected to a pump of the turbine;

a set of nozzles including a first group of nozzles disposed in the outer nozzle container, a second group of nozzles disposed in the first part of the inner nozzle container, and a third group of nozzles disposed in the second part of the inner nozzle container; and collectors corresponding to the third group of nozzles, the collectors being inserted into the outer nozzle container and configured to collect the substance.

2. The nozzle set of claim 1, wherein the outer nozzle container, the inner nozzle container, the diaphragm, the flange, the spokes, the nozzles, and the collectors are manufactured by three-dimensional (3D) printing in a single technological cycle.

3. The nozzle set of claim 2, wherein:

an internal side of one of the outer nozzle container and the inner nozzle container form a contour in a plane parallel to a direction of the 3 D printing, the contour including a base, a first curve extended from the base, and a second curve extended from the base, the first curve and the second curve having diverging sections and converging sections, the diverging sections of the first curve and the diverging sections of the second curve being diverging relative to each other, the converging sections of the first curve and the converging sections of the second curve being converging relative to each other, the first curve and the second curve converging on a single point; and an angle between the direction of the 3 D printing and a tangent to the contour at a point at the converging sections not exceeding a limit angle enabling the 3 D printing of the outer nozzle container without using a support structure.

4. The nozzle set of claim 2, wherein:

an internal side of one of the collectors forms a contour in a plane parallel to a direction of the 3 D printing, the contour including a base, a first side curve extended from the base, and a second side curve extended from the base, the first side curve and the second side curve having diverging sections and converging sections, the diverging sections of the first curve and the diverging sections of the second curve being diverging relative to each other, the converging sections of the first curve and the converging sections of the second curve being converging relative to each other, the first side curve and the second side curve converging on a single point; and an angle between the direction of the 3 D printing and a tangent to the contour at a point at the converging sections not exceeding a limit angle enabling the 3 D printing of the collectors without using a support structure.

5. The nozzle set of claim 2, wherein:

an external side of one of the collectors forms a contour in a plane parallel to a direction of the 3 D printing, the contour including a base, a first side curve extended from the base, and a second side curve extended from the base, the first side curve and the second side curve having diverging sections and converging sections, the diverging sections of the first curve and the diverging sections of the second curve being diverging relative to each other, the converging sections of the first curve and the converging sections of the second curve being converging relative to each other, the first side curve and the second side curve converging on a single point; and an angle between the direction of the 3 D printing and a tangent to the contour at a point at the diverging sections not exceeding a limit angle enabling the 3 D printing the collectors without using a support structure.

6. The nozzle set of claim 2, wherein the outer nozzle container and the inner nozzle container share a common wall, the common wall being used as a support structure during the 3 D printing.

7. The nozzle set of claim 2, wherein the nozzles have legs used as a support structure during the 3 D printing.

8. The nozzle set of claim 2, wherein the inner nozzle container has an inlet pipe branch for supplying the substance into the inner nozzle container, the inlet pipe branch being located at the first part of the inner nozzle container.

9. The nozzle set of claim 1, further comprising a further flange connected to the diaphragm, the further flange being configured to be connected to a body of the pump to hermetically seal the cavity of the turbine.

10. The nozzle set of claim 1, wherein the flange is connected to the inner nozzle container using the spokes and the diaphragm, wherein the diaphragm is a single part with a housing of the nozzle set.

11. The nozzle set of claim 1, wherein the spokes are disposed around an axis of the circle and have space intervals between each other.

12. The nozzle set of claim 1, wherein the spokes are of a curvilinear shape.

13. The nozzle set of claim 1, wherein:

a wall thickness of the nozzles is variable;

a wall thickness of the inner nozzle container is variable; and a wall thickness of the outer nozzle container is variable.

14. The nozzle set of claim 1, wherein a wall thickness of the collectors is variable.

15. The nozzle set of claim 1, wherein the nozzles are of a thin-walled shape.

16. The nozzle set of claim 1, wherein the collectors are of a thin-walled shape.

17. The nozzle set of claim 1, wherein the outer nozzle container and the inner nozzle container are of a thin-walled shape.

18. The nozzle set of claim 1, wherein the inner nozzle container and the collectors have a variable cross-section.

19. The nozzle set of claim 1, wherein the outer nozzle container and the second part of the inner nozzle container have a common wall.

20. A method for manufacturing an integrated nozzle set for injecting a substance into a turbine, the integrated nozzle set, the method comprising:

manufacturing an outer nozzle container arranged around a part of a circle;

manufacturing an inner nozzle container including a first part and a second part, the first part being arranged around a remaining part of the circle and the second part being concentric with the outer nozzle container and disposed closer to a center of the circle than the outer nozzle container;

manufacturing a diaphragm connected to the inner nozzle container and configured to hermetically seal a cavity of the turbine;

manufacturing a flange having spokes, the spokes being connected to the inner nozzle container, the flange being configured to be connected to a pump of the turbine;

manufacturing a set of nozzles including a first group of nozzles disposed in the outer nozzle container, a second group of nozzles disposed in the first part of the inner nozzle container, and a third group of nozzles disposed in the second part of the inner nozzle container; and manufacturing collectors corresponding to the third group of nozzles, the collectors being inserted into the outer nozzle container and configured to collect the substance.

\* \* \* \* \*